July 26, 1949.    R. J. LEE    2,477,257
COMBINE PICKUP
Filed Aug. 14, 1945

Robert J. Lee,
INVENTOR.
BY McMorrow, Berman & Davidson
Attorneys

Patented July 26, 1949

2,477,257

UNITED STATES PATENT OFFICE 2,477,257

COMBINE PICKUP

Robert J. Lee, Corwith, Iowa

Application August 14, 1945, Serial No. 610,753

8 Claims. (Cl. 198—8)

This invention relates to a combine pick up.

An object of this invention is to provide an improved pick up for grain for a combine comprising a belt pick up formed into a V-shape at its forward end.

A further object of this invention is to provide an improved pick up for a combine in which a pair of belts at an angle to each other are used to pick up and divide the windrow into two separate streams to spread the material over a wider area.

Another object of this invention is to provide an improved combine pick up having a pair of belts diverging from each other rearwardly and with a common drive mechanism for the belts, located between said belts.

Figure 1:
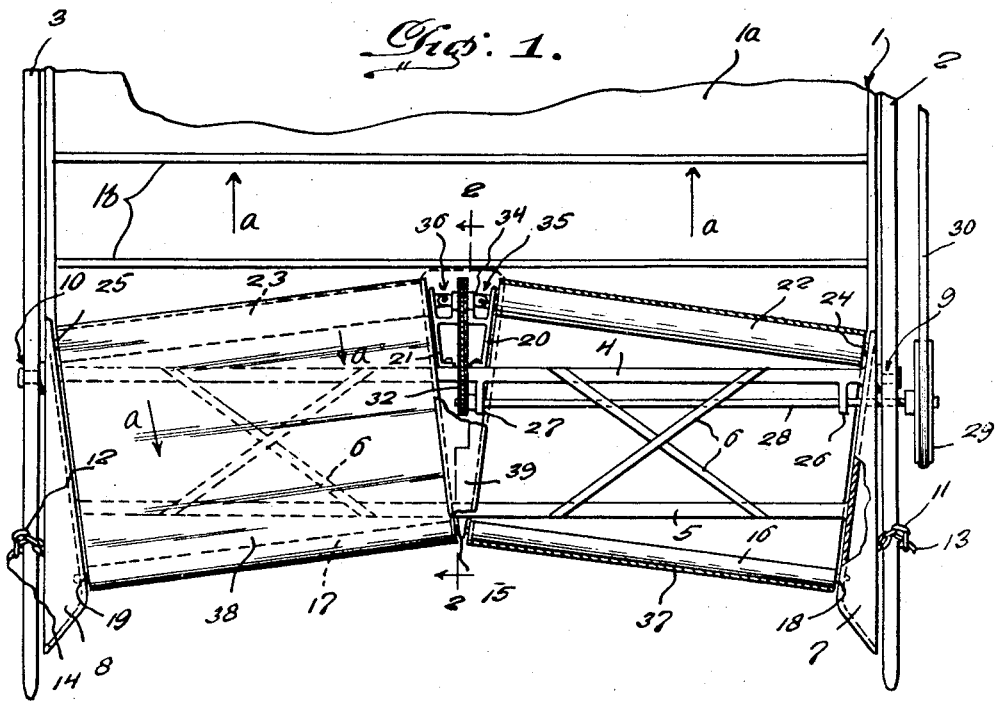
Figure 2:
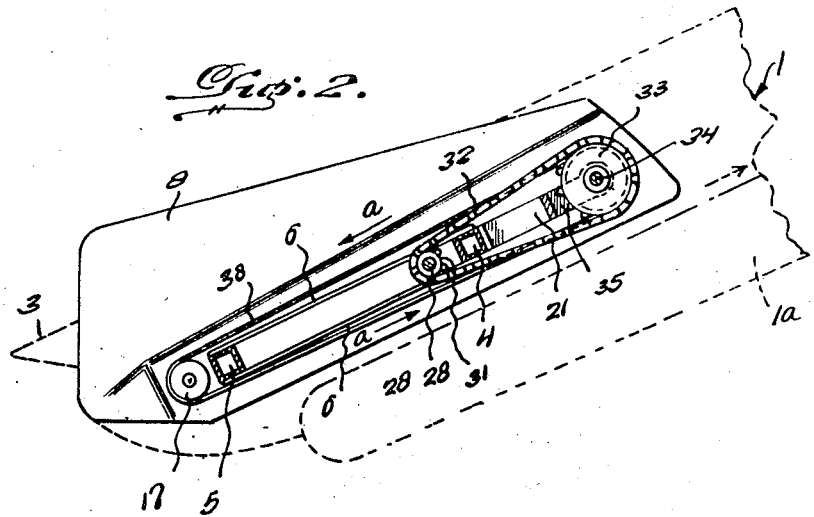

Other objects of this invention will appear from the following specification and claims and from the accompanying drawing illustrating the invention, wherein:

Figure 1 is a plan view showing the V-shape of the pick up with parts of the mechanism broken away and shown in cross-section to better illustrate the construction thereof; and Figure 2 is a sectional view taken along line 2—2 of Figure 1.

Referring to the drawing, 1 refers to a conventional combine having side walls 2 and 3. Disposed between the forward ends of side walls 2 and 3 is the forward end of the main elevator 1a comprising a flexible belt having transverse slats 1b secured thereon, and a pick-up mechanism which starts the material from the windrows onto the main elevator which feeds it into the threshing mechanism. The pick up has a main frame constructed of horizontal bars 4 and 5 reinforced by cross braces 6. The ends of the bars 4 and 5 are rigidly attached by suitable means to end plates 7 and 8 each of which is a hollow, sheet metal member having its edges at its open side substantially in a common plane and a V-shape in plan to fill up the space between the pick up belt and the side frame of the combine, as seen in Figure 1. The rear ends of the V-shaped end plates 7 and 8 are provided with integral pins 9 and 10 which are inserted in openings in side walls 2 and 3 so that the pick up frame is pivoted on the combine. The forward ends of plates 7 and 8 are provided with chains 11 and 12 which are fastened to hooks 13 and 14 on frames 2 and 3. The chains provide a means for adjusting the height of the forward end of the pick up from the ground.

The center part of bar 5 has a projection 15 which provides bearings for the inner ends of forward rollers 16 and 17. The outer ends of these rollers are journaled in end plates 7 and 8 at 18 and 19, respectively. The center part of bar 4 is provided with brackets 20 and 21 which provide bearings for the inner ends of rearward rollers 22 and 23, respectively. The outer ends of these rollers are journaled in end plates 7 and 8 at 24 and 25, respectively. Bar 4 is also provided with lugs 26 and 27 in which is journaled drive shaft 28 which is driven from pulley 29 and belt 30, receiving power from any suitable source. The inner end of drive shaft 28 is provided with a sprocket 31, which through chain 32, drives sprocket 33, driving a short shaft 34 journaled in a bracket 34' mounted between brackets 20 and 21. Rollers 22 and 23 are connected to shaft 34, for rotation, through universal joints 35 and 36, respectively. Belts 37 and 38 are mounted on rollers 16 and 22, on the one hand, and rollers 17 and 23 on the other hand. Rollers 22 and 23 are five inch rollers and rollers 16 and 17 are three inch rollers.

As seen in Figure 1, the structure provides for the belts 37 and 38 to form a V with each other, diverging rearwardly. The drive mechanism between the belts is suitably covered with a steel, tin or other metallic housing 39. The arrows $a$ in the figures show the direction of movement of the drive mechanism and the belts.

In operation, the belts 37 and 38 will divide the windrow and carry the grain towards the combine in two streams and will thus deliver the grain more evenly and give the machine more capacity than would be possible with a single belt. The housing 39 in the center of the pick up device will assist in dividing the stream and the inclined inner side of end plates 7 and 8 will guide the material onto the elevator.

The angle between the belts may vary but a ten degree angle is suitable. This angle may be made greater if necessary to house the drive mechanism.

While a certain specific embodiment of this invention has been shown, it will be understood that various modifications may be made within the spirit of the invention. Therefore no limitations on the invention are intended other than are imposed by the scope of the appended claims.

I claim:

1. A pick up mechanism for a combine comprising a pair of conveyor belts positioned at the forward end of said combine, said belts being disposed side by side in the same plane and diverging from each other in a rearward direction, drive mechanism for said belts positioned between said belts, and a V-shaped housing for said drive mechanism disposed between said belts, whereby said housing divides the material to be picked up into two streams which are carried in diverging paths by said belts.

2. A pick up mechanism for a combine as claimed in claim 1, wherein a frame is provided for carrying said conveyor belts, and wherein the rear end of said frame has a pivotal connection to said combine whereby said conveyor belts may yield during operation.

3. A pick up mechanism for a combine as claimed in claim 1, wherein conveyor rolls are provided to support said belts, a frame is provided for supporting said rolls, and said frame is provided at each side with a plate, each of said plates having a pivotal connection to said combine whereby said conveyor belts may yield during operation.

4. In a pick up mechanism for a combine comprising a frame, conveyor rolls carried by said frame, and a pair of diverging belts carried by said conveyor rolls; a drive mechanism for said belts disposed between said belts and carried by said frame; a V-shaped housing for said drive mechanism positioned between said belts; and side plates attached to the sides of said frame; said side plates being of a hollow V-shaped construction, whereby said housing and side plates divide the material to be picked up into two streams to be carried away by said belts in diverging paths.

5. In a windrow pick-up combine having a main elevator, side plates supporting said main elevator, a pair of pick-up belts supported above the forward end portion of said main elevator, and a pair of rollers carrying each of said pick-up belts; frame means supporting said pick-up belt rollers from said side plates in position such that said pick-up belts diverge rearwardly relative to each other, and means driving said pick-up belts comprising a short shaft operatively connected between the inner ends of two of said rollers respectively associated with said pick-up belts, a drive shaft extending from one of said side plates through one of said belts to a position adjacent said short shaft, and means drivingly connecting said drive shaft with said short, roller-connected shaft.

6. In a windrow pick-up combine having a main elevator, side plates supporting said elevator, a pair of pick-up belts supported above the forward end portion of said main elevator, and a pair of rollers carrying each of said pick-up belts; frame means supporting said pick-up belt rollers from said side plates in position such that said pick-up belts diverge rearwardly relative to each other, means driving said pick-up belts comprising a short shaft operatively connected between the inner ends of two of said rollers respectively associated with said pick-up belts, a drive shaft extending from one of said side plates through one of said belts to a position adjacent said short shaft, and means drivingly connecting said drive shaft with said short, roller-connected shaft, a triangular-shaped housing for said drive means disposed between said pick-up belts and operative to divide material moving with said pick-up belts into two, separate, divergent streams.

7. In a windrow pick-up combine having a main elevator, side plates supporting said elevator, a pair of pick-up belts supported above the forward end portion of said main elevator, and a pair of rollers carrying each of said pick-up belts; frame means supporting said pick-up belt rollers from said side plates in position such that said pick-up belts diverge rearwardly relative to each other, means driving said pick-up belts comprising a short shaft operatively connected between the inner ends of two of said rollers respectively associated with said pick-up belts, a drive shaft extending from one of said side plates through one of said belts to a position adjacent said short shaft, and means drivingly connecting said drive shaft with said short, roller-connected shaft, a triangular-shaped housing for said drive means disposed between said pick-up belts and operative to divide material moving with said pick-up belts into two, separate, divergent streams, and end plates disposed between the outer edges of said pick-up belts and the corresponding side plates having open outer sides contacting the corresponding side plates and inclined inner sides lying along the outer edges of the corresponding pick-up belts.

8. In a windrow pick-up combine having a main elevator, side plates supporting said main elevator, a pair of pick-up belts supported above the forward end portion of said elevator, and a pair of rollers carrying each of said pick-up belts; means supporting said pick-up belts and belt-carrying rollers from said side plates comprising a pair of spaced-apart, substantially parallel transverse members extending across said main elevator, bracket means on said transverse members rotatively supporting the inner ends of said rollers, a pair of hollow end plates having inclined inner walls secured one to each end of said pair of transverse members and rotatively supporting the outer ends of said rollers, respective pins securing the rearward ends of said end plates to said side plates, and flexible means securing the forward ends of said end plates to said side plates for movement of said end plates relative to said side plates about said pins.

ROBERT J. LEE.

REFERENCES CITED

The following references are of record in the file of this patent:

UNITED STATES PATENTS

| Number | Name | Date |
|---|---|---|
| 981,085 | Heser | Jan. 10, 1911 |
| 1,253,601 | Jones | Jan. 15, 1918 |
| 2,113,999 | Troyer | Apr. 12, 1938 |